United States Patent
Hori et al.

(10) Patent No.: US 8,409,401 B2
(45) Date of Patent: Apr. 2, 2013

(54) SEPARATING METHOD FOR DARK CERAMICS SINTERED BODY

(75) Inventors: Masahiro Hori, Tokyo (JP); Kazuishi Mitani, Tokyo (JP); Yasuhiro Saito, Tokyo (JP); Nobuyuki Takatsuki, Tokyo (JP); Kyouichi Shukuri, Sagamihara (JP); Shunji Kuramoto, Sagamihara (JP)

(73) Assignee: Nippon Sheet Glass Co., Ltd., Tokyo (JP)

( * ) Notice: Subject to any disclaimer, the term of this patent is extended or adjusted under 35 U.S.C. 154(b) by 889 days.

(21) Appl. No.: 11/991,870

(22) PCT Filed: Sep. 11, 2006

(86) PCT No.: PCT/JP2006/318438
§ 371 (c)(1),
(2), (4) Date: May 8, 2008

(87) PCT Pub. No.: WO2007/032502
PCT Pub. Date: Mar. 22, 2007

(65) Prior Publication Data
US 2010/0227752 A1 Sep. 9, 2010

(30) Foreign Application Priority Data
Sep. 12, 2005 (JP) .................. 2005-264370

(51) Int. Cl.
*B32B 38/10* (2006.01)
(52) U.S. Cl. .............. 156/703; 156/711; 156/927
(58) Field of Classification Search .................. 156/344, 156/584, 703, 704, 711, 752, 927
See application file for complete search history.

(56) References Cited

U.S. PATENT DOCUMENTS

| | | | | |
|---|---|---|---|---|
| 5,889,351 A | * | 3/1999 | Okumura et al. | 310/321 |
| 8,118,971 B2 | * | 2/2012 | Hori et al. | 156/703 |
| 8,246,847 B2 | * | 8/2012 | Hori et al. | 216/83 |
| 2010/0193465 A1 | | 8/2010 | Hori et al. | |

FOREIGN PATENT DOCUMENTS

| | | |
|---|---|---|
| JP | 57-123826 A | 8/1982 |
| JP | 2001-106553 A | 4/2001 |
| JP | 2003-063842 A | 3/2003 |
| JP | 2003-073144 A | 3/2003 |
| JP | 2003-080461 A | 3/2003 |
| JP | 2005-108468 A | 4/2005 |

OTHER PUBLICATIONS

Machine translation of Japanese Patent Publication 2001-106553, Shigeaki Yonemori, 2011.*

(Continued)

*Primary Examiner* — Mark A Osele
(74) *Attorney, Agent, or Firm* — Holtz, Holtz, Goodman & Chick, P.C.

(57) ABSTRACT

There are provided an aqueous solution for separation of a dark ceramics sintered body, which can easily collect in a recyclable condition a glass with a dark ceramics sintered body, and a separating method therefor, and an aqueous solution for separation with which a dark ceramics sintered body, a conductive ceramics sintered body and a glass are separately collected from a glass with a dark ceramics sintered body formed with the dark ceramics sintered body and the conductive ceramics sintered body, and a separating method therefor. A treatment liquid (hydrofluoric acid, a mixture of ammonium fluoride and an acid, etc.) having an etching ability for at least one of a glass and a dark ceramic sintered body is prepared as an aqueous solution 20 for separation of the dark ceramics sintered body, then type A treatment liquid is charged in a container 11, and a glass with a dark ceramics sintered body 30 is placed in the container 11.

2 Claims, 2 Drawing Sheets

OTHER PUBLICATIONS

Notification Concerning Transmittal of International Preliminary Report on Patentability, Chapter I of the Patent Cooperation Treaty, dated May 22, 2008, for PCT/JP2006/318438. 5 sheets.

U.S. Appl. No. 11/991,871, filed May 8, 2008; First Named Inventor: Masahiro Hori; Title: "Separating Method for Conductive Ceramics Sintered Body".

* cited by examiner

SEPARATING METHOD FOR DARK CERAMICS SINTERED BODY

This application is a U.S. National Phase Application under 35 USC 371 of International Application PCT/JP2006/318438 filed Sep. 11, 2006.

TECHNICAL FIELD

The present invention relates to a separating method for a dark ceramics sintered body and particularly relates to: a separating method for a dark ceramics sintered body, which is useful for collecting a glass in a recyclable condition from a glass with a dark ceramics sintered body; and a separating method for a dark ceramics sintered body, which is useful for separately collecting, from a glass with a dark ceramics sintered body formed with the dark ceramics sintered body and a conductive ceramics sintered body, the glass, the dark ceramics sintered body and the conductive ceramics sintered body.

BACKGROUND ART

As shown in FIG. 2, various substances different in nature from a glass plate are attached to the glass plate for an automobile rear glass. In the automobile rear glass 50 in FIG. 2, a glass plate 52 is attached with substances different in nature from a glass plate such as an adhesive agent for fixing the glass plate 52 to an automobile body, a dark ceramics sintered body 53 for concealing this adhesive agent from the outside of the automobile, and a conductive ceramics sintered body 51 for removing mist from the glass plate 52 or imparting an antenna function to the glass plate 52.

In order to collect this glass plate 52 in a recyclable condition, as a method of removing the dark ceramics sintered body 53 from the glass plate 52, a method in which a fluid containing fine particles is blown out from a nozzle to the dark ceramics sintered body 53 to make the fluid containing fine particles collide with the dark ceramics sintered body 53, and the dark ceramics sintered body 53 is scraped away from the glass plate 52 has been known (see, for example, Japanese Patent Application Laid-Open No. 2003-80461).

In the above described method, however, since the dark ceramics sintered body 53 is scraped away from the glass plate 52 by making the fluid containing fine particles collide with the conductive ceramics sintered body 51, dusts of the scraped dark ceramics sintered body 53 are generated, then deteriorating a working environment. Further, it takes long hours to completely scrape off the dark ceramics sintered body 53 from the glass plate 52. Furthermore, in scraping off the dark ceramics sintered body 53, generated dusts may be attached to the glass plate 52 or may damage the glass plate 52, and thereby a glass plate sometimes cannot be collected in a recyclable condition from a glass plate with a dark ceramics sintered body. Moreover, in the case of a glass with a dark ceramics sintered body, that is attached with the dark ceramics sintered body on which a conductive ceramics sintered body, it has been impossible to conduct separate collection of the conductive ceramics sintered body and the dark ceramics sintered body.

An object of the present invention is to provide: a separating method for a dark ceramics sintered body, which can easily collect a glass in a recyclable condition from a glass with a dark ceramics sintered body; and a separating method which can separately collect, from a glass with a dark ceramics sintered body formed with the dark ceramics sintered body and a conductive ceramics sintered body on the dark ceramics sintered body, the dark ceramics sintered body, the conductive ceramics sintered body and the glass.

DISCLOSURE OF THE INVENTION

In order to achieve the above object, according to a first aspect of the present invention, there is provided an aqueous solution for separation of a dark ceramics sintered body, which separates the dark ceramics sintered body from a glass, wherein the aqueous solution has an etching ability for at least one of the glass and the dark ceramics sintered body.

In the first aspect, it is preferred that the aqueous solution for separation is an acidic aqueous solution comprising a fluorine ion.

In the first aspect, it is preferred that the aqueous solution for separation has a hydrogen ion concentration (pH) of 2 or less.

In the first aspect, it is preferred that the acidic aqueous solution comprises $HF_2^-$ as the fluorine ion.

In the first aspect, it is preferred that the concentration of the $HF_2^-$ is 0.005 mol/L or more.

In the first aspect, it is preferred that the aqueous solution for separation comprises a complex formation component.

In the first aspect, it is preferred that the complex formation component comprises one or two or more selected from the group consisting of aminocarboxylic acids such as ethylenediaminetetraacetic acid (EDTA), nitrilotriacetic acid (NTA), and diethylenetriaminepentaacetic acid (DTPA), and salts thereof, oxycarbonic acids such as oxalic acid, tartaric acid, malic acid, citric acid, malonic acid, succinic acid, and gluconic acid, and salts thereof, and phosphonic acids such as phosphoric acid, hydroxyethane diphosphoric acid (HEDP), and tripolyphosphoric acid (TPP), and salts thereof.

In the first aspect, it is preferred that the acidic aqueous solution comprises a surfactant.

In order to achieve the above object, according to an aspect of the present invention, there is provided a separating method for a dark ceramics sintered body comprising an immersion step of immersing a glass with a dark ceramics sintered body in an aqueous solution for separation of a dark ceramics sintered body for separating a dark ceramics sintered body from a glass, wherein the aqueous solution for separation has a hydrofluoric acid concentration of 0.25 to 0.75 mol/l.

In the aspect, it is preferred that the glass with a dark ceramics sintered body has the dark ceramics sintered body and a conductive ceramics sintered body, and in the separating method, a glass, the dark ceramics sintered body, and the conductive ceramics sintered body are separately collected.

BEST MODE FOR CARRYING OUT THE INVENTION

Figure 1:
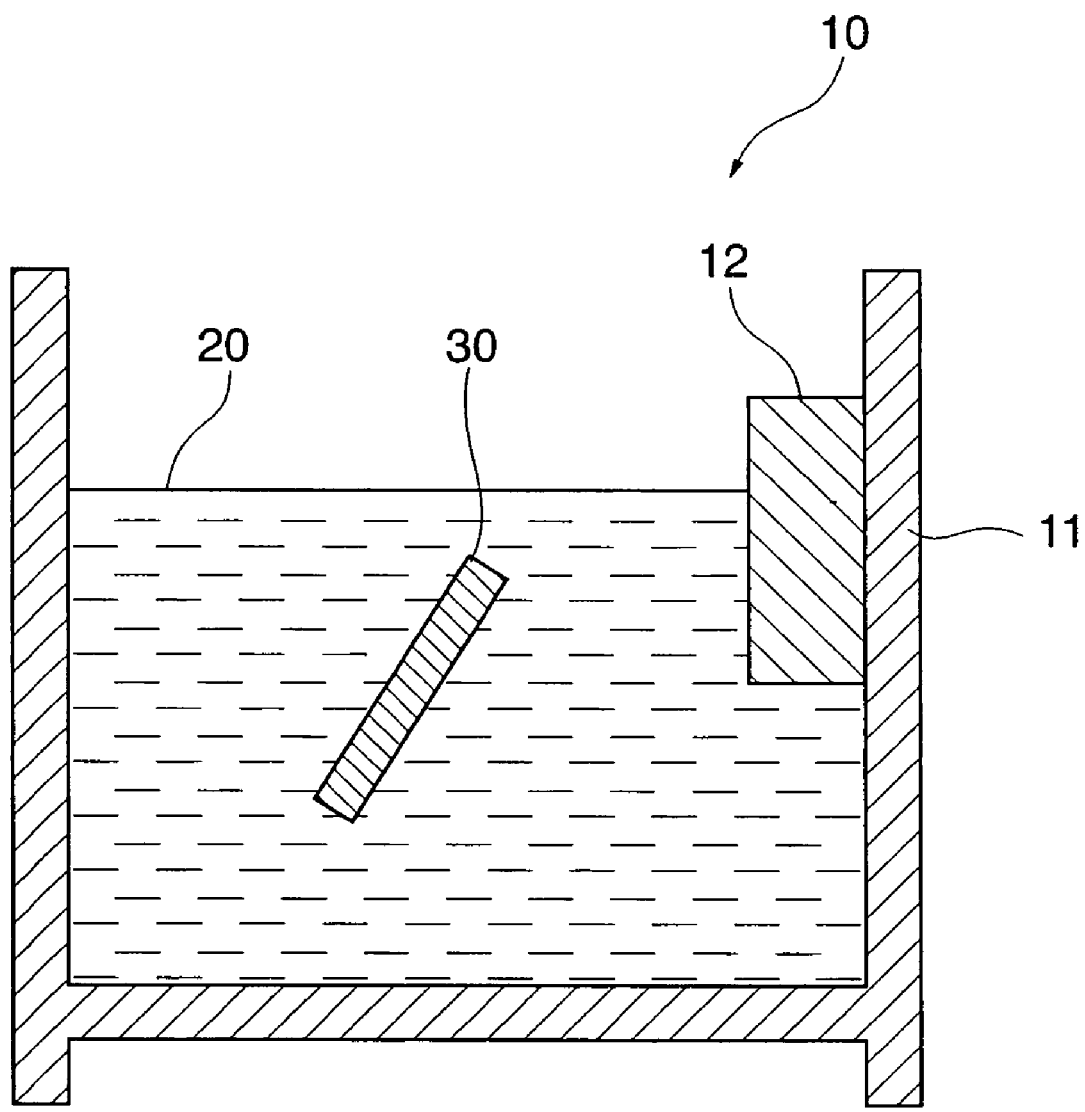
FIG. 1 is a cross-sectional view schematically showing a structure of a liquid bath used for immersing a glass into the aqueous solution for separation of a dark ceramics sintered body according to an embodiment of the present invention.
Figure 2:
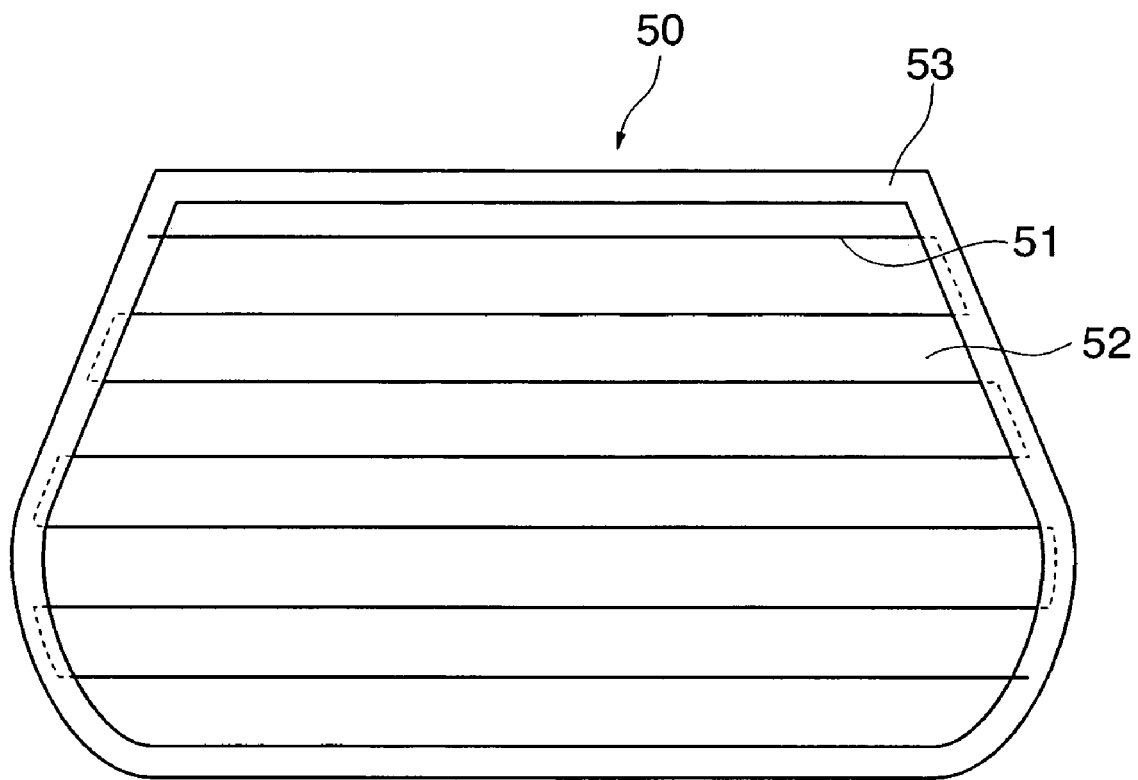
FIG. 2 is a view schematically showing a structure of a conventional automobile rear glass.

The inventors of the present invention made intensive research in order to attain the above described object and as a result discovered that if an aqueous solution for separation of a dark ceramics sintered body, which separates the dark ceramics sintered body from a glass, has etching ability for at least one of the glass and the dark ceramics sintered body, a glass can be easily collected in a recyclable condition from a glass with a dark ceramics sintered body. Further, they discovered that, regarding a glass with a dark ceramics sintered body formed with the dark ceramics sintered body and a conductive ceramics sintered body, the dark ceramics sintered body, the conductive ceramics sintered body and the glass can be separately collected from the glass with a dark ceramics sintered body.

Furthermore, the present inventors have found that when the above aqueous solution for separation is an acid aqueous solution having a hydrogen ion concentration (pH) of 2 or less and containing a fluorine ion, the aqueous solution for separation dissolves a pigment component of a dark ceramics sintered body and thus has a high etching effect on the dark ceramics sintered body.

The present invention was accomplished based on the results of the above described studies.

Hereinafter, an aqueous solution for separation of a dark ceramics sintered body and a separating method therefor according to embodiments of the present invention will be described.

As an aqueous solution for separation of a dark ceramics sintered body according to an embodiment of the present invention, hydrofluoric acid (hereinafter referred to as "type A treatment liquid") and a mixture of ammonium fluoride and an acid (hereinafter referred to as "type B treatment liquid") were prepared. The aqueous solution for separation is not limited thereto, but a mixture of ammonium sulfate and hydrofluoric acid, a mixture of hydrofluoric acid and an acid, hexafluorosilicic acid, or the like may be used. All of these aqueous solutions for separation contain $HF_2^-$ that is an ion species of cutting a siloxane bond. In a mixture of hydrofluoric acid and an acid, an acid to be mixed in, such as sulfamic acid, phosphoric acid, nitric acid, sulfuric acid, acetic acid, formic acid, hydrochloric acid and carbonic acid can be used.

The hydrofluoric acid (type A treatment liquid) preferably has an HF concentration of 0.025 mol/L (0.05 wt %) or more and 0.75 mol/L (1.5 wt %) or less. An HF concentration of 0.025 mol/L results in 0.0025 mol/L of $HF_2^-$, and an HF concentration of 0.75 mol/L results in 0.075 mol/L of $HF_2^-$.

In the type A treatment liquid, when a concentration of ion species of cutting a siloxane bond, that is $HF_2^-$, is less than 0.005 mol/L (HF concentration of 0.05 mol/L (0.10 wt %)), the $HF_2^-$ concentration decreases during a treatment for separating a dark ceramics sintered body from a glass, and decrease in an etching rate for the glass and/or the dark ceramics sintered body is significant. Therefore, in order to separate in a short time, it is preferred that a $HF_2^-$ concentration is not less than 0.005 mol/L (HF concentration of 0.05 mol/L (0.10 wt %)). However, if the $HF_2^-$ concentration is excessively high, a large amount of precipitate of fluoride is generated as an etching residue, which causes a problem on operation.

Further, a high concentration of $HF_2^-$ makes a separation time of a dark ceramic sintered material close to a separation time of a conductive ceramics sintered body, which makes it difficult to separate the dark ceramic sintered material from the conductive ceramics sintered body in recycling a glass with a dark ceramic sintered material and a conductive ceramics sintered body formed therewith.

Herein, main chemical species present in the type A treatment liquid are HF, $H^+$, $F^-$ and $HF_2^-$ and expressed by the following equilibrium formulas (1) and (2):

$$[HF] \Leftrightarrow [H^+]+[F^-] \quad (1)$$

$$[HF_2^-] \Leftrightarrow [HF]+[F^-] \quad (2)$$

Equilibrium constants in the equilibrium formulas (1) and (2) are respectively expressed by $K_1$ and $K_2$. $K_1$ and $K_2$ are estimated by various techniques, typically by an electrochemical technique. A $[HF_2^-]$ concentration can be calculated from values of $K_1$ and $K_2$, and a hydrogen ion concentration $[H^+]$ and a hydrofluoric acid concentration $[HF]$ in hydrofluoric acid.

When a strong acid such as sulfuric acid as a proton source is added to hydrofluoric acid (type A treatment liquid), a concentration of $HF_2^-$ that is ion species of cutting a siloxane bond can be increased, thus being more preferable because dark ceramics sintered body can be etched.

According to the above description, when a treatment liquid is hydrofluoric acid (type A treatment liquid) or a solution obtained by adding a strong acid to hydrofluoric acid (type B treatment liquid), the treatment liquid can easily penetrate into an interface between a glass and a dark ceramics sintered body, and thus the glass and the dark ceramics sintered body can be separated.

In a mixture of ammonium fluoride and an acid (type B treatment liquid), similar to hydrofluoric acid (type A treatment liquid), it is preferred that a $HF_2^-$ concentration is not less than 0.005 mol/L.

Herein, chemical species mainly present in the type B treatment liquid are $NH_4F$, HF, $H^+$, $F^-$, $HF_2^-$ and $NH_4^+$, and are expressed by the following equilibrium formulas (4) to (6):

$$[HF] \Leftrightarrow [H^+]+[F^-] \quad (4)$$

$$[HF_2^-] \Leftrightarrow [HF]+[F^-] \quad (5)$$

$$[NH_4F] \Leftrightarrow [NH_4^+]+[F^-] \quad (6)$$

Equilibrium constants in the equilibrium formulas (4) to (6) are respectively expressed by $K_1$, $K_2$ and $K_3$. $K_1$, $K_2$ and $K_3$ are estimated by various techniques, typically by an electrochemical technique. A $[HF_2^-]$ concentration can be calculated from values of $K_1$, $K_2$ and $K_3$, and a hydrogen ion concentration $[H^+]$ and an ammonium fluoride concentration $[NH_4F]$.

Addition of a complex formation component to the type A and B treatment liquids allows a glass component to be captured in the form of an ion, thereby enhancing an etching ability for a glass. As the complex forming component, the following can be suitably combined to be used: aminocarboxylic acids such as ethylenediaminetetraacetic acid (EDTA), nitrilotriacetic acid (NTA) and diethylenetriaminepentaacetic acid (DTPA), and salts thereof, oxycarboxylic acids such as oxalic acid, tartaric acid, malic acid, citric acid, malonic acid, succinic acid and gluconic acid, and salts thereof, and phosphoric acids such as phosphoric acid, hydroxyethane diphosphoric acid (HEDP) and tripolyphosphoric acid (TPP), and salts thereof. For the complex forming component, oxalic acid, tartaric acid, malic acid, citric acid, malonic acid, succinic acid and gluconic acid, phosphoric acid, hydroxyethane diphosphoric acid (HEDP) and tripolyphosphoric acid (TPP), and salts thereof are more preferable from the viewpoint of stability in an acidic aqueous solution.

Higher temperatures of the type A and B treatment liquids preferably increase an etching rate with respect to a glass or a dark ceramics sintered body. However, if the temperatures of the type A and B treatment liquids are higher than necessary, the treatment liquids have a large evaporation rate, then causing difficulties in liquid concentration control. In addition, a larger etching rate causes a problem on operation such as generation of a large amount of precipitate of fluoride as an etching residue. Therefore, the temperatures of the type A and B treatment liquids are preferably from 30 to 60° C.

According to an embodiment of the present invention, since the etching ability is exhibited for at least one of a glass or a dark ceramics sintered body, a glass can be easily collected from a glass formed with dark ceramics sintered body in a recyclable condition.

In the present embodiment, a physical force is preferably applied to a treatment liquid or a glass formed with dark ceramics sintered body for rapid replacement of the treatment liquid in the surface vicinity of a glass or a dark ceramics sintered body (hereinafter, referred to as "substrate surface vicinity"). Rapid replacement of a treatment liquid in the substrate surface vicinity enables smooth supplement of etching species ($HF_2^-$, complex formation component) to the substrate surface vicinity when the etching species are consumed, thereby preventing a decrease of etching rate. As a result, a glass and a dark ceramics sintered body are separated from each other in a shorter period. Further, deposition of an etching residue such as precipitate of fluoride in the substrate surface vicinity inhibits etching. However, application of a physical force to a treatment liquid or a glass formed with dark ceramics sintered body prevents the deposition of the etching residue. As the physical force to be applied to a treatment liquid or a glass formed with a dark ceramics sintered body, an ultrasonic wave, for example, is applied, and then a separation time of dark ceramics sintered body from a glass is shorten to about one-quarter thereof. The above physical force is not limited thereto, but examples thereof include vibration, shaking or water flow.

The glass on which a conductive ceramics sintered body is formed in the present invention, includes a glass on which a dark ceramics sintered body is formed such as a glass for an automobile window, a glass for a building window, a glass for a plasma display, and the like. The automobile window means respective parts of windows such as a front window, a rear window, a side window, etc. By the way, a front window is generally formed from a laminated glass, and other parts of the glasses are formed from a reinforced glass. The laminated glass is formed by laminating a plurality of glasses via intermediate films. Therefore, in order to collect and regenerate a front window glass, intermediate films and glasses are separated in addition to the separating method of the present invention. In any way, according to the present invention, a dark ceramics sintered body can be separated from a glass on which the dark ceramics sintered body is formed.

As the dark ceramics sintered body separated, it can be exemplified a dark ceramics sintered body, which hides an adhesive for fixing a glass to a vehicle or the like from the outside of the vehicle. A dark ceramics sintered body may be formed on one surface of a glass plate, on both surfaces thereof, or on different portions of both surfaces thereof. A dark ceramics sintered body has a composition of silicon oxide and other various metal oxides.

As a method for isolating and collecting separated dark ceramics, filtration, centrifuge and precipitation can be exemplified.

If separated dark ceramics are left in a treatment liquid, their components are eluted in the liquid, which will be a cause for decreasing an etching rate. Separated dark ceramics can be continuously isolated and collected with a filtration apparatus or a centrifuge, and a glass can be easily collected from a glass with sintered materials in a recyclable condition. Alternatively, precipitation of dark ceramics in a setting tank can be collected easily.

Example 1

In Example 1, a glass attached with the dark ceramics sintered body on which the conductive ceramics sintered body is formed was immersed in hydrofluoric acid (type A treatment liquid) and a mixture of ammonium fluoride and an acid (type B treatment liquid), which had been heated to a predetermined temperature. During the immersion of the glass, an ultrasonic wave with a frequency of 40 kHz was applied.

As the type A treatment liquid, 7 types of samples (samples A1 to A7) were prepared so that the HF concentration were 0.025 to 1.5 mol/L (0.05 to 3.0 wt %). The $HF_2^-$ concentration of samples A1 to A7 were estimated to be 0.0025 to 0.15 mol/L. The compositions of the samples A1 to A7 are shown in Table 1. A sulfuric acid was added so that the sulfuric acid concentration was 0.1 to 2 wt %, and thus the liquids had a pH of 2 or less.

The type B treatment liquid was a mixture liquid containing ammonium fluoride, sulfamic acid and phosphoric acid. Two kinds of samples (samples B1 and B2) were prepared so that the $HF_2^-$ concentration were 0.01 mol/L and 0.014 mol/L. The compositions of the treatment liquids are shown in Table 2.

FIG. 1 is a sectional view schematically showing a structure of a liquid bath used for immersing the glass into the aqueous solution for separation of dark ceramics sintered body according to an embodiment of the present invention.

In FIG. 1, a liquid bath 10 is provided with: a container 11 for holding the type A and B treatment liquids as an aqueous solution 20 for separation of dark ceramics sintered body; and a thermoregulator 12 for adjusting a temperature of the aqueous solution 20 for separation. The aqueous solution 20 for separation was charged in the container 11; the charged aqueous solution 20 for separation was controlled to have a predetermined temperature; and a glass with dark ceramics sintered body 30 was placed in the container 11.

Regarding the glass with dark ceramics sintered body 30 immersed in the aqueous solution 20 for separation, a time period (separation time), during which the dark ceramics sintered body was separated from a glass, was measured. For the treatment liquids (type A and B treatment liquids) used as the aqueous solution 20 for separation, the compositions, temperatures and measured separation time were shown in Tables 1 and 2.

In the case of the immersion in sample A1, it took 1 hour or more for the separation time. From a viewpoint of recycling process, the $HF_2^-$ concentration is preferably 0.005 mol/L or more (The $HF_2^-$ concentration in sample A2 or more).

TABLE 1

| Type A treatment liquid | | Sample A1 | Sample A2 | Sample A3 | Sample A4 | Sample A5 | Sample A6 | Sample A7 |
|---|---|---|---|---|---|---|---|---|
| HF concentration (hydrofluoric acid conc.) | mol/L | 0.03 | 0.05 | 0.10 | 0.25 | 0.30 | 0.75 | 1.50 |
| | wt % | 0.05 | 0.1 | 0.2 | 0.5 | 0.6 | 1.5 | 3.0 |
| $HF_2^-$ conc. | mol/L | 0.0025 | 0.005 | 0.01 | 0.025 | 0.03 | 0.075 | 0.15 |

TABLE 1-continued

| Type A treatment liquid | | Sample A1 | Sample A2 | Sample A3 | Sample A4 | Sample A5 | Sample A6 | Sample A7 |
|---|---|---|---|---|---|---|---|---|
| Temperature of treatment liquid | °C. | 40 | 40 | 40 | 40 | 40 | 40 | 40 |
| Separation time | sec. | 6300 | 2400 | 1500 | 720 | 600 | 210 | 85 |

TABLE 2

| Type B treatment liquid | | Sample B1 | Sample B2 |
|---|---|---|---|
| $NH_4F$ conc. (ammonium fluoride conc.) | mol/L | 0.10 | 0.14 |
| | wt % | 0.35 | 0.53 |
| $HF_2^-$ conc. | mol/L | 0.01 | 0.014 |
| sulfamic acid conc. | mol/L | 0.10 | 0.15 |
| | wt % | 1.0 | 1.5 |
| phosphoric acid conc. | mol/L | 0.10 | 0.15 |
| | wt % | 1.0 | 1.5 |
| Temperature of treatment liquid | °C. | 40 | 40 |
| Separation time | sec. | 2400 | 1800 |

According to Tables 1 and 2, it has been found that: the dark ceramics sintered body is separated from a glass by immersing the a glass with the dark ceramics sintered body in the type A and B treatment liquids; the treatment liquids are continuously treated with a centrifuge (for an apparatus having a centrifugal radius of 15 cm, the rotation number is 2000 rpm or more, centrifugal acceleration: 168 G or more) or a filtration apparatus (having a mesh size of 5 μm or less), and thereby 95% or more of separated dark ceramics are removed from the separation liquid; and a glass can be easily collected in a recyclable condition from the glass with dark ceramics sintered body.

Example 2

In Example 2, when using a treatment liquid obtained by adding 0.1 wt % of tartaric acid as a complex forming component to the sample A3 as sample A3'. Sample A3' had an etching rate of 120 nm/min. to a glass, which was twice as large as the etching rate (60 nm/min.) of the case with no addition of tartaric acid (sample A3).

Further, in the same manner as in Example 1, a glass with dark ceramics sintered body was immersed in sample A3' with a liquid temperature of 40° C. and an ultrasonic wave with a frequency of 40 kHz was applied. In such a case, the separation time was 20 minutes, which was shortened to about a half of the separation time (40 minutes) for the case with no addition of tartaric acid (sample A3).

Herein, the etching rate was obtained by: masking a part of a surface of soda-lime glass with an acid-resistant tape; immersing the glass in hydrofluoric acid with a predetermined concentration and a liquid temperature of 50° C. for 30 minutes; removing the acid-resistant tape; and measuring unevenness of the glass surface formed by etching with a surface roughness meter.

Addition of a complex formation component to hydrofluoric acid allowed the etching rate to the glass to be improved, thereby more easily separating dark ceramics sintered body from the glass.

Example 3

In Example 3, the above-described hydrofluoric acid (samples A1 to A7) were prepared in the same manner as in Example 1 and their liquid temperatures were kept at 40° C. A glass formed (printed) with both dark ceramics sintered body and conductive ceramics sintered body thereon was immersed in the liquids and an ultrasonic wave with a frequency of 40 kHz was applied.

The glass formed with dark ceramics sintered body and conductive ceramics sintered body was immersed in the above hydrofluoric acid (samples A1 to A7), and a time period (separation time of conductive ceramics sintered body), during which the conductive ceramics sintered body was separated from the glass, and a time period (separation time of dark ceramics sintered body), during which the dark ceramics sintered body was separated from the glass, were measured. In addition, a time difference between the separation time of conductive ceramics sintered body and the separation time of dark ceramics sintered body was calculated as an index for separately collecting dark ceramics sintered body and conductive ceramics sintered body. These results are shown in Table 3.

TABLE 3

| Type A treatment liquid | | Sample A1 | Sample A2 | Sample A3 | Sample A4 | Sample A5 | Sample A6 | Sample A7 |
|---|---|---|---|---|---|---|---|---|
| HF conc. (hydrofluoric acid conc.) | mol/L | 0.025 | 0.05 | 0.10 | 0.25 | 0.30 | 0.75 | 1.50 |
| | wt % | 0.05 | 0.1 | 0.2 | 0.5 | 0.6 | 1.5 | 3.0 |
| $HF_2^-$ conc. | mol/L | 0.0025 | 0.005 | 0.01 | 0.025 | 0.03 | 0.075 | 0.15 |
| Temp. of treatment liquid | °C. | 40 | 40 | 40 | 40 | 40 | 40 | 40 |
| Separation time of conductive ceramics | sec. | — | 987 | 440 | 267 | 223 | 137 | 83 |
| Separation time of dark ceramics | sec. | 6300 | 2400 | 1500 | 720 | 600 | 210 | 85 |

TABLE 3-continued

| Type A treatment liquid | | Sample A1 | Sample A2 | Sample A3 | Sample A4 | Sample A5 | Sample A6 | Sample A7 |
|---|---|---|---|---|---|---|---|---|
| Time difference* | sec. | — | 1413 | 1060 | 453 | 377 | 73 | 2 |

Time difference*: separation time of dark ceramics sintered body – separation time of conductive ceramics sintered body For immersion in sample A6 or A7, a time difference between the separation time of conductive ceramics and the separation time of dark ceramics was short, approximately 1 minute or 2 seconds, respectively. Immersion in sample A7 did not allow separate collection of dark ceramics sintered body from conductive ceramics sintered body and separate collection was difficult in the case of immersion in sample A6. For immersion in samples A1 to A5, the above time difference was 6 minutes or more. Thus, it has been found that conductive ceramics sintered body and dark ceramics sintered body can be independently separated from a glass, and dark ceramics sintered body separated from a glass and a conductive ceramics sintered body separated from dark ceramics sintered body were individually collected.

Example 4

In Example 4, a glass with a dark ceramics sintered body was immersed in a treatment liquid with a temperature of 40° C. in the same manner as in Example 1 except that an ultrasonic wave with a frequency of 40 kHz was not applied when the glass with the dark ceramics sintered body was immersed in the liquid.

The case of Example 1 wherein an ultrasonic wave was applied (with an ultrasonic wave) was compared with the case of Example 4 wherein an ultrasonic wave was not applied (without an ultrasonic wave) in terms of separation time of dark ceramics. The results are shown in Table 4.

TABLE 4

| Type A treatment liquid | | Sample A5 | Sample A6 | Sample A7 |
|---|---|---|---|---|
| HF conc. (hydrofluoric acid conc.) | mol/L | 0.30 | 0.75 | 1.5 |
| | wt % | 0.6 | 1.5 | 3.0 |
| HF$_2^-$ conc. | mol/L | 0.03 | 0.075 | 0.15 |
| Temperature of treatment liquid | ° C. | 40 | 40 | 40 |
| Separation time of dark ceramics (with ultrasonic wave) | sec. | 600 | 210 | 85 |
| Separation time of dark ceramics (without ultrasonic wave) | sec. | 2400 | 900 | 420 |

The case with no application of ultrasonic wave had much longer separation time of dark ceramics in comparison with the case with application of ultrasonic wave (4 times or more).

The invention claimed is:

1. A separating method for separating a dark ceramics sintered body and a conductive ceramics sintered body, using an aqueous solution for separation having a hydrofluoric acid concentration of 0.05 to 0.75 mol/l, from a glass formed with both of the dark ceramics sintered body and the conductive ceramics sintered body on a surface thereof, the method comprising:
   separating the conductive ceramics sintered body from the glass formed with both of the dark ceramics sintered body and the conductive ceramics sintered body on the surface thereof by immersing the glass in the aqueous solution for separation during a first separation time period;
   separating the dark ceramics sintered body from the glass formed with both of the dark ceramics sintered body and the conductive ceramics sintered body on the surface thereof by immersing the glass in the aqueous solution for separation during a second separation time period longer than the first separation time period, wherein a difference in length between the first separation time period and the second separation time period is not less than one minute;
   wherein the glass, the dark ceramics sintered body, and the conductive ceramics sintered body are separately collected utilizing the difference in length between the first separation time period and the second separation time period.

2. A separating method for separating a dark ceramics sintered body and a conductive ceramics sintered body, using an aqueous solution for separation having a hydrofluoric acid concentration of 0.05 to 0.75 mol/l, from a glass formed with both of the dark ceramics sintered body and the conductive ceramics sintered body on a surface thereof, the method comprising:
   immersing the glass formed with both of the dark ceramics sintered body and the conductive ceramics sintered body on the surface thereof in the aqueous solution for separation such that the conductive ceramics sintered body separates from the glass after a first separation time period and the dark ceramics sintered body separates from the glass after a second separation time period that is longer than the first separation time period, wherein a difference in length between the first separation time period and the second separation time period is not less than one minute;
   using the difference in length between the first and second separation periods to separately collect the dark ceramics sintered body and the conductive ceramics sintered body.

* * * * *